(12) United States Patent
Kernkamp

(10) Patent No.: US 7,015,673 B1
(45) Date of Patent: Mar. 21, 2006

(54) METHOD AND APPARATUS FOR REDUCING GENERATED HEAT IN THREE-PHASE MOTORS DRIVING AIR CIRCULATION FANS IN LARGE INDUSTRIAL REFRIGERATORS AND FREEZERS

(76) Inventor: John Kernkamp, P.O. Box 2995, Citrus Heights, CA (US) 95611

(*) Notice: Subject to any disclaimer, the term of this patent is extended or adjusted under 35 U.S.C. 154(b) by 0 days.

(21) Appl. No.: 10/755,176

(22) Filed: Jan. 8, 2004

(51) Int. Cl.
 *H02P 5/28* (2006.01)
(52) U.S. Cl. .................. 318/798; 318/811; 318/807; 363/132
(58) Field of Classification Search ............... 318/811, 318/812, 510, 512, 562, 138, 807; 363/138, 363/98, 132, 127, 129, 137
See application file for complete search history.

(56) References Cited

U.S. PATENT DOCUMENTS

| | | | |
|---|---|---|---|
| 3,597,638 A | | 8/1971 | Jensen et al. |
| 3,668,493 A | | 6/1972 | Maynard |
| 3,767,988 A | | 10/1973 | Jensen |
| 3,821,620 A | | 6/1974 | Lindberg |
| 4,006,603 A | * | 2/1977 | Miles ........................ 62/229 |
| 4,214,196 A | * | 7/1980 | Boyce ....................... 318/811 |
| 4,258,303 A | * | 3/1981 | Boyce ....................... 318/811 |
| 4,333,046 A | | 6/1982 | Lee |
| 4,437,133 A | | 3/1984 | Rueckert |
| 4,438,383 A | | 3/1984 | Etheridge |
| 4,523,269 A | * | 6/1985 | Baker et al. ............... 363/138 |
| 4,567,420 A | | 1/1986 | Beck |
| 4,959,573 A | * | 9/1990 | Roberts ..................... 310/68 R |
| 5,041,768 A | | 8/1991 | Herrmann |
| 5,216,356 A | | 6/1993 | Owen |
| 5,300,870 A | | 4/1994 | Smith |
| 5,300,871 A | | 4/1994 | Bucher et al. |
| 5,488,835 A | | 2/1996 | Howenstine et al. |
| 5,621,296 A | | 4/1997 | Werner et al. |
| 5,703,458 A | | 12/1997 | Gershen et al. |
| 5,717,584 A | * | 2/1998 | Rajashekara et al. ......... 363/98 |
| 5,797,276 A | | 8/1998 | Howenstine et al. |
| 5,852,559 A | * | 12/1998 | Li ............................. 363/163 |
| 5,962,996 A | * | 10/1999 | Goto et al. ................. 318/4 |
| 5,982,136 A | | 11/1999 | Pelly |
| 5,998,889 A | | 12/1999 | Novak |
| 6,069,809 A | * | 5/2000 | Inoshita ..................... 363/98 |
| 6,318,966 B1 | | 11/2001 | Madara et al. |
| 6,337,801 B1 | * | 1/2002 | Li et al. .................... 363/127 |
| 6,397,612 B1 | | 6/2002 | Kernkamp et al. |
| 6,522,098 B1 | | 2/2003 | Majumdar |
| 6,566,841 B1 | | 5/2003 | Bush et al. |

(Continued)

*Primary Examiner*—Paul Ip

(57) ABSTRACT

A method and apparatus is disclosed for reducing the heat generated by three-phase motors operating under load in cooled chambers such as industrial walk-in refrigerators and freezers. Specific control elements are introduced into the three power conductors connected to a three-phase motor, the elements chosen so as to cause the motor to turn at a speed below a certain critical speed, above which the elements have no control over the motor power used or the motor speed. The results of inserting the control elements into the motor power conductors are (1) the motor turns at a reduced speed and (2) the heat generated by the motor is reduced. In addition, the control elements themselves are specifically chosen and are of such a nature that they generate virtually no heat in the process of reducing the power supplied to the motor.

10 Claims, 4 Drawing Sheets

U.S. PATENT DOCUMENTS

| | | | |
|---|---|---|---|
| 6,717,465 B1 * | 4/2004 | Chou et al. | 330/149 |
| 2001/0033507 A1 * | 10/2001 | Li et al. | 363/132 |
| 2003/0169109 A1 * | 9/2003 | Chou et al. | 330/149 |
| 2004/0145932 A1 * | 7/2004 | Skeist et al. | 363/152 |
| 2004/0227486 A1 * | 11/2004 | Kerlin | 318/807 |
| 2004/0257832 A1 * | 12/2004 | Skeist et al. | 363/1 |

* cited by examiner

METHOD AND APPARATUS FOR REDUCING GENERATED HEAT IN THREE-PHASE MOTORS DRIVING AIR CIRCULATION FANS IN LARGE INDUSTRIAL REFRIGERATORS AND FREEZERS

FIELD OF THE INVENTION

The following invention relates generally to reducing the amount of heat generated by three-phase motors, and more specifically to the reducing the amount of heat generated by the three-phase motors used to drive the air circulation fans in large industrial refrigerators and freezers.

BACKGROUND OF THE INVENTION

This invention represents the inventor's ongoing efforts in the field of large scale refrigeration systems.

It is desirable to be able to reduce the heat generated by high-power three-phase motors used for air circulation in large industrial refrigerators and freezers. Excess heat generated by these motors must be removed from the cooled chamber by the chamber refrigeration system. Reducing the generated heat causes the system to operate less often, thus saving energy and reducing the cost of operating the refrigerator or freezer. Such reduction of motor heat has proven to be effective in saving energy and cost of operation in smaller, single-phase powered walk-in refrigerators and freezers, such as those in restaurants and convenience stores.

Prior art methods of reducing motor-generated heat in three-phase motors include complicated, high power systems that either control the frequency of the applied power or divide the applied power into short pulses. These systems are very expensive, very difficult to install, and require, in some circumstances, replacement of the standard motors with special motors using high voltage insulation. In addition, the existing three-phase control systems generate large amounts of heat in the performance of their control function, often greater than the amount of motor heat that they save.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| 3,597,638 | Aug. 31, 1971 | Jensen, et al. |
| 3,668,493 | Jun. 6, 1972 | Maynard |
| 3,767,988 | Oct. 23, 1973 | Jensen |
| 3,821,620 | Jun. 28, 1974 | Lindberg |
| 4,333,046 | Jun. 1, 1982 | Lee |
| 4,437,133 | Mar. 13, 1984 | Rueckert |
| 4,438,383 | Mar. 20, 1984 | Etheridge |
| 4,567,420 | Jan. 28, 1986 | Beck |
| 5,041,768 | Aug. 20, 1991 | Hermann |
| 5,216,356 | Jun. 1, 1993 | Owen |
| 5,300,870 | Apr. 5, 1994 | Smith |
| 5,400,871 | Apr. 5, 1994 | Bucher et al. |
| 5,488,835 | Feb. 6, 1996 | Howenstine et al. |
| 5,621,296 | Apr. 15, 1997 | Werner et al. |
| 5,703,458 | Dec. 30, 1997 | Gershen et al. |
| 5,797,276 | Aug. 25, 1998 | Howenstine et al. |
| 5,982,136 | Nov. 9, 1999 | Pelly |

-continued

| PATENT NO. | ISSUE DATE | INVENTOR |
|---|---|---|
| 5,998,889 | Dec. 7, 1999 | Novak |
| 6,318,966 | Nov. 20, 2001 | Madara et al. |
| 6,397,612 | Jun. 4, 2002 | Kernkamp et al. |
| 6,522,098 | Feb. 18, 2003 | Majumdar |
| 6,566,841 | May 20, 2003 | Bush et al. |

SUMMARY OF THE INVENTION

A capacitor is inserted into each of the three power conductors supplying power to a three-phase motor. The three capacitors are physically mounted in a bank, for installation convenience. The capacitors are chosen based on the horsepower of the motor and each one is of identical value. The capacitors cause the voltage and current supplied to the motor to be reduced. The results of the reduced voltage and power being applied to the motor are (1) the motor rotates at a slower than normal speed and (2) the heat generated by the motor is reduced.

Because capacitors act as short-circuits for a very short period of time when they are switched into electrical circuits, a very large current can flow into them at the moment that they are connected to the motor. To reduce this high inrush current, inductors are included in the capacitor bank, one inductor in series with each capacitor.

A special three-pole, double-throw relay is used to alternately connect the three-phase motor to the normal source of three-phase power or to the capacitor bank. Thus, the motor may be alternately run at its full speed or at its heat-saving lower voltage. This relay may be replaced with solid-state power switches in some systems.

A controller is included in the system to sense whether the refrigeration system is in cooling mode or in idle mode. If the refrigeration system is in cooling mode, the controller connects the three-phase motor to normal power by appropriately controlling the relay, thus causing the fan to circulate the normal amount of air required for proper operation of the refrigeration system. If the refrigeration system is idle, the controller connects the three-phase motor to the capacitor bank, reducing the heat generated by the motor and reducing the amount of circulated air to a lower level.

OBJECTS OF THE INVENTION

It is a primary object of the present invention to provide a method and apparatus that reduces heat generated in the operation of a refrigeration unit.

It is a further object of the present invention to provide a method and apparatus as characterized above that is simple to install and less expensive than existing control systems.

It is a further object of the present invention to provide a method and apparatus as characterized above that generates minimal heat in the performance of its heat-saving function.

It is a further object of the present invention to provide a method and apparatus as characterized above that is compatible with three-phase motor systems.

Viewed from a first vantage point, it is an object of the present invention to provide an apparatus for reducing heat generated by a three-phase motor operating under load, comprising, in combination: a power supply; the three-phase motor coupled to a fan and to the power supply, the motor connected to the power supply by means of three power conductors; and a plurality of capacitors, the capacitors inserted into each power conductor such that equal capacitance is introduced into each power conductor.

Viewed from a second vantage point, it is an object of the present invention to provide a method of generating minimal heat in a refrigeration system using a three-phase motor, the steps including: dividing a main power source into a plurality of auxiliary power sources, wherein at least one of the auxiliary power sources is of lower magnitude than the main power source, the main power source appropriate for the three-phase motor; determining status of a refrigerated enclosure; and activating switching means, said switching means connecting the three-phase motor to one power source, wherein magnitude of the power source is chosen according to the status, and wherein the three-phase motor operates a fan in the enclosure.

These and other objects will be made manifest when considering the following detailed specification when taken in conjunction with the appended drawing figures.

DESCRIPTION OF PREFERRED EMBODIMENTS

Figure 1:
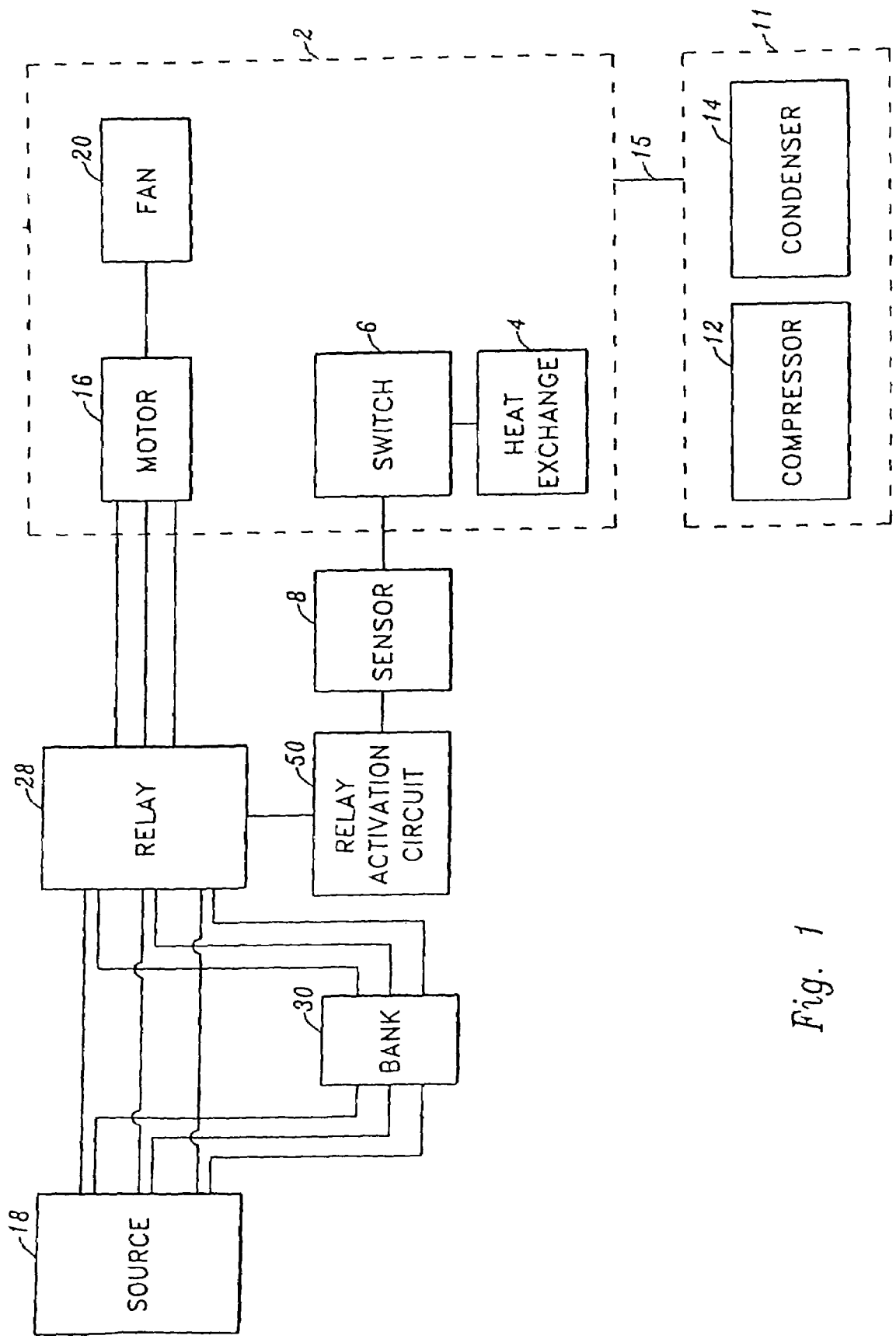
FIG. 1 is a block diagram of the cooling system according to the present invention.

Considering the drawings, wherein like reference numerals denote like parts throughout the various drawing figures, reference numeral 10 is directed to the control system according to the present invention.

The present invention may be installed in an industrial size refrigerator or freezer unit. Referring to FIG. 1, the refrigerator or freezer is a large insulated chamber 2, of sufficient size to allow personnel and loading equipment to enter and load or unload goods to be kept cool. Size of the chamber 2 may vary from a few hundred cubic feet to hundreds of thousands of cubic feet, typically no more than 20 to 30 feet high (inside dimension). Heat exchangers/evaporators 4 are mounted inside the chamber 2, preferably on the ceiling, but they may also be located on the floor, against a side wall. Also installed inside the chamber 2 is a thermostatic switch 6, which controls the cooling system and maintains the temperature inside the chamber at a set level. Other major components, typically a unit 11 containing a compressor 12 and a condenser 14, are located outside the chamber 2 and are operatively coupled via conduit 15 to the system to provide refrigerant into the chamber 2 and to the heat exchangers/evaporators 4. The compressor 12 and condenser 14 may be separate entities, as shown in FIG. 1, or they may be a single integration.

Figure 2:
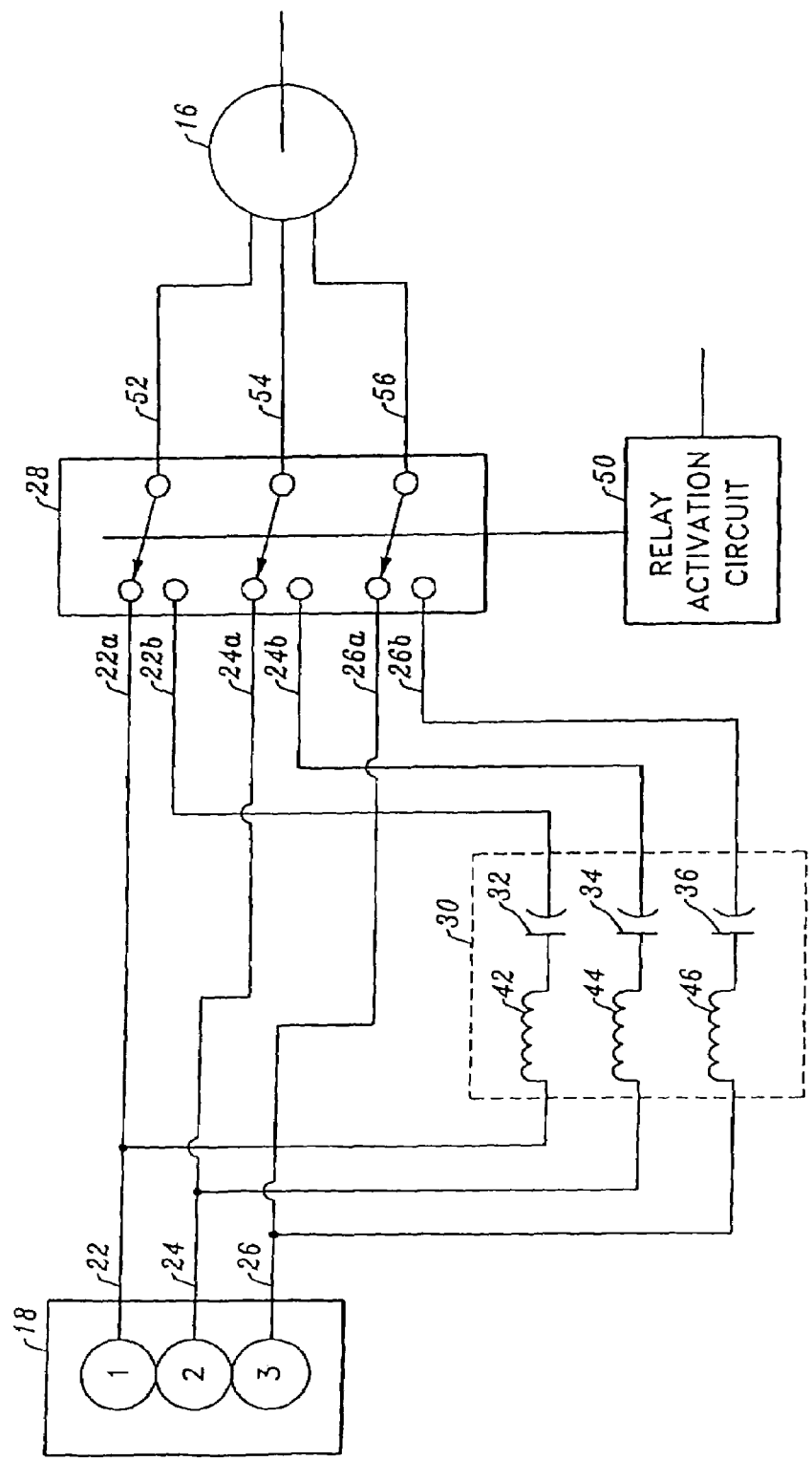
FIG. 2 depicts the control circuit for the three-phase motor according to the present invention.

The switch 6 is connected to a sensor 8 that monitors the status of the cooling system. The sensor 8 connects to an electronic circuit 50 that operates a three-phase relay 28 to supply power to a three-phase motor 16 that is powered by a three-phase power source 18. The three-phase motor 16 is connected to a fan 20. Referring to FIG. 2, the power source 18 has three line 22,24,26, each of which has two branches (a and b). One branch of each line 22a,24a,26a connects directly to one pole of a three-pole, double-throw relay 28, one line per pole. The other branch of each line 22b,24b,26b leads to a capacitor bank 30. A capacitor 32,34,36 is inserted into each line 22b,24b,26b. An inductor 42,44,46 is placed in series with each capacitor to reduce any high current that is introduced into the capacitors 32,34,36 when the current path is switched. Each line 22b,24b,26b exits the capacitor bank 30 and connects to the pole of the three-phase relay 28 opposite from its corresponding direct line 22a,24a,26a from the power source 18.

Figure 4:
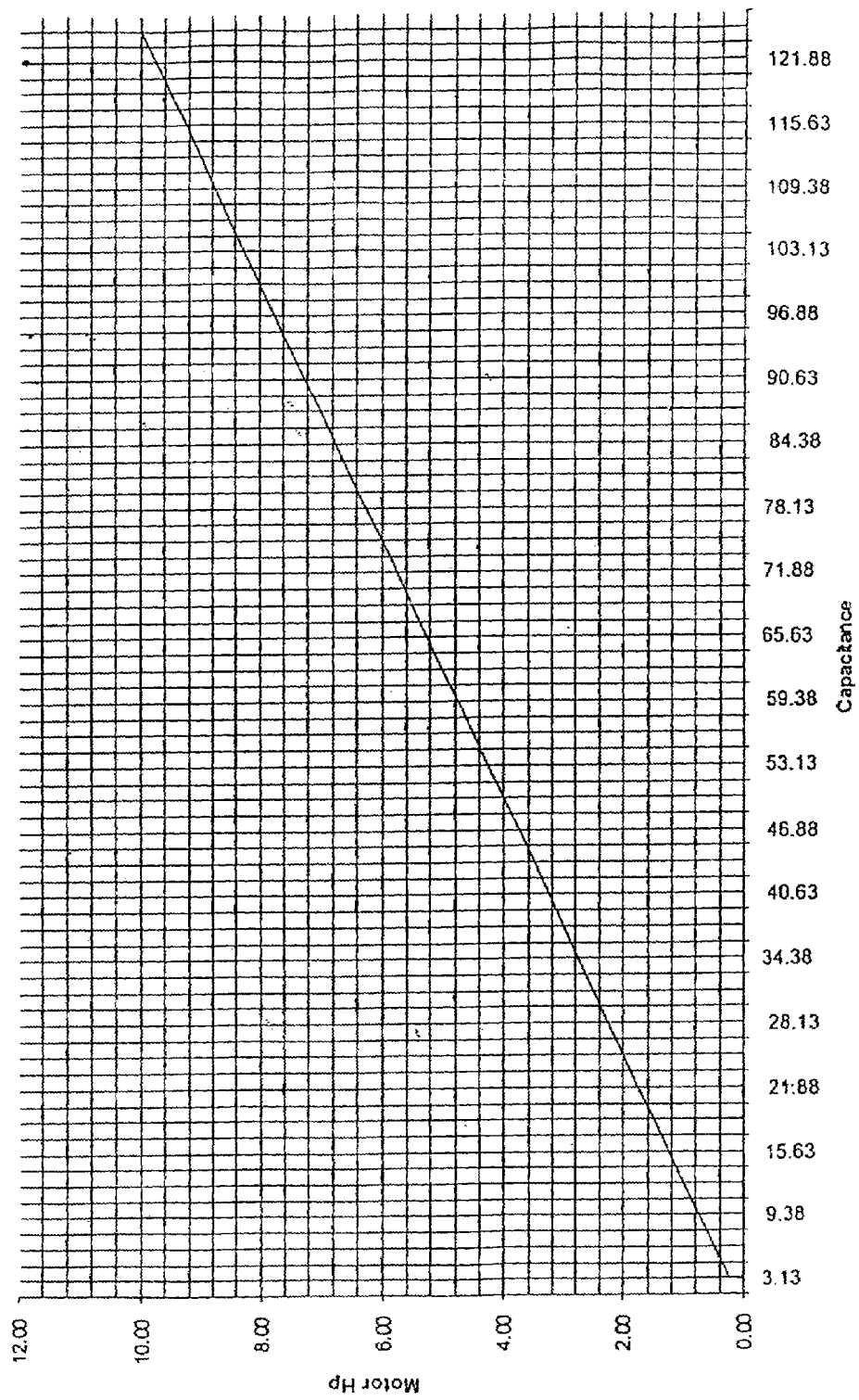
FIG. 4 is a graph showing the relationship between motor size and capacitance for a three-phase motor operating at the reduced speed of 350 RPM.

The capacitor bank 30, which includes the inductors 42,44,46 and the capacitors 32,34,36, is separately enclosed. The size of the capacitors 32,34,36 inside the bank are selected for the horsepower rating of the controlled motor(s) 16 to properly reduce the speed (and heat) of the motor 16 when the system is idle (see FIG. 4). Capacitor banks 30 therefore are available in a selection of standard sizes to accommodate different motor size requirements. For example, FIG. 4 shows that for a 2 hp motor, operating at the reduced speed of 350 RPM, the capacitance required is 25 microfarads. The capacitors 32,34,36 on each line 22b,24b, 26b are all of equal capacitance.

The three-phase relay 28 is controlled by an electronic circuit 50 which senses the operational status of the cooling system and operates the relay 28 to run the fan(s) at high speed when the cooling system is active and at low speed when the cooling system is idle. The electronic circuit 50 that operates the relay 28 is housed in a separate enclosure from that containing the capacitor bank 30. The relay 28 has three output lines 52,54,56, which connect to the three-phase motor 16.

Figure 3:
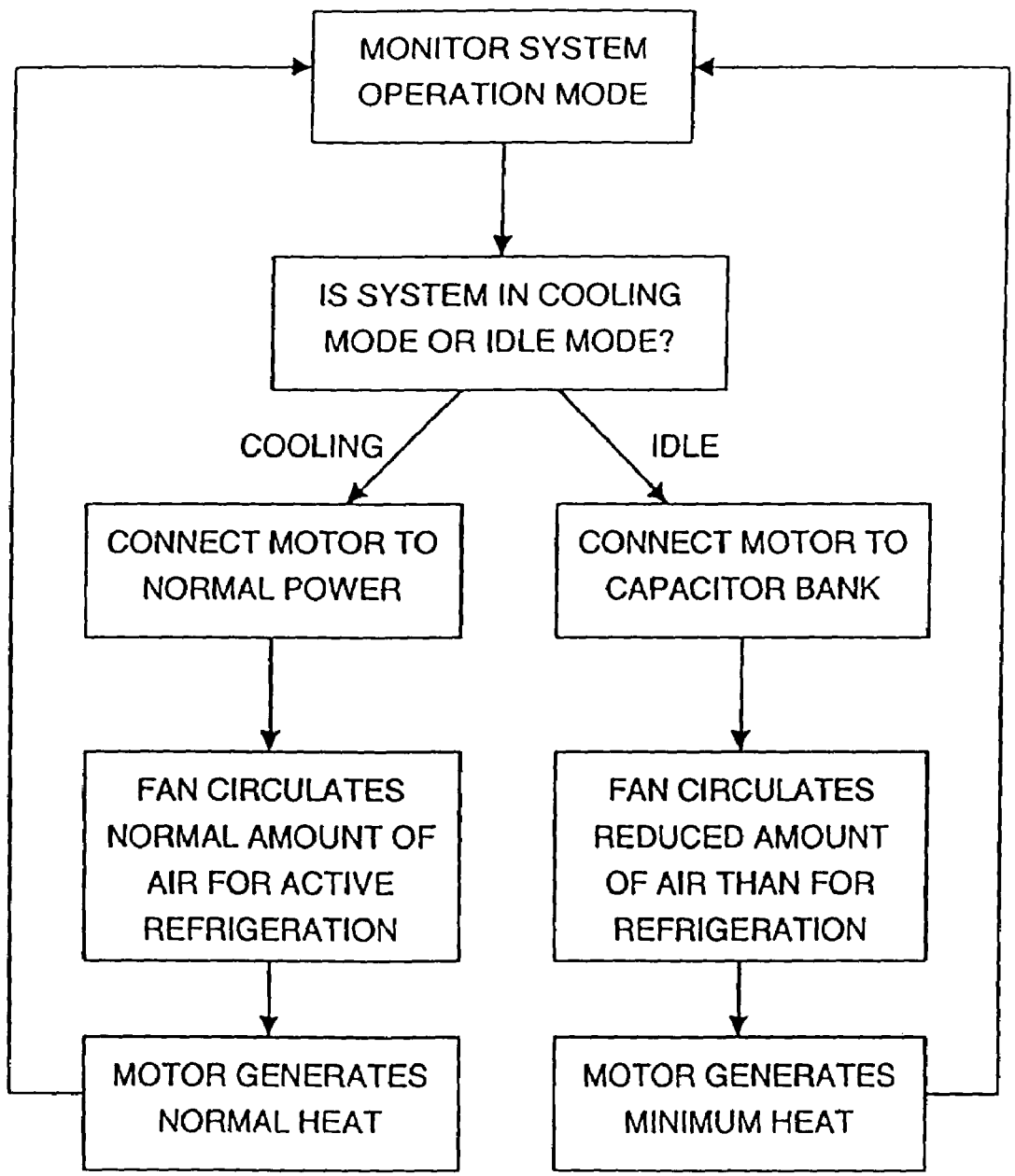
FIG. 3 is a flowchart illustrating the operation of the control circuit.

Thus, referring to FIG. 3, when the entire system is in operation, the electronic circuit 50 monitors the operation mode of the system. If the system is determined to be in cooling mode, the circuit 50 operates the relay 28 to connect the motor 16 to the power source 18 through lines 22a, 24a26a at normal power, air is circulated for refrigeration, and the motor 16 generates a normal amount of heat. If the system is determined to be in idle mode, the circuit 50 operates the relay 28 to connect the motor 16 to the power source 18 through the capacitor bank 30 using lines 22b, 24b,26b, a reduced amount of air is circulated, and the motor 16 generates a minimum amount of heat.

The range of values of capacitance which can be used to control the motor speed is limited. The normal speed is in the 1200–1800 RPM range, depending on the motor. Below a particular value, the motor will not turn. Above this lowest operational value, which depends on the size of the motor, the speed of the motor can be set to a speed below the motor's normal speed by selection of capacitor values. As the capacitor value is incrementally increased, the motor's speed correspondingly increases. However, there is a critical value of capacitance above which the motor increases to its normal speed, and the capacitors have no control. This occurs in the 500–600 RPM motor speed range. The highest speed at which the capacitors continue to control the motor speed is the critical speed.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. An apparatus for reducing heat generated by a tree-phase motor operating under load, comprising, in combination:
    a power supply;
    said three-phase motor coupled to a fan and to said power supply, said motor connected to said power supply by means of three power conductors;
    a plurality of capacitors, said capacitors inserted into said power conductors such that equal capacitance is introduced into each said power conductor;
    wherein said plurality of capacitors are mounted in a separate bank; and further comprising means to select power input level connected to said motor, wherein said means to select power input level alternatively connects said motor to said power supply and said capacitor bank.

2. The apparatus of claim 1 further comprising control means, said control system comprising:
   means to monitor system status; and
   means to automatically operate said means to select power input level according to said system status.

3. The apparatus of claim 2 wherein said means to select power input level comprises a three-pole, double-throw relay.

4. The apparatus of claim 3 wherein said means to select power input level comprises a plurality of solid state power switches.

5. The apparatus of claim 4 further comprising an plurality of inductors, each said inductor in series with each said capacitor.

6. The apparatus of claim 5 wherein said fan is located in an enclosure, said enclosure having heat exchange means.

7. The apparatus of claim 6 further comprising compressor means and condenser means external to said enclosure.

8. A method of generating minimal beat in a refrigeration system using a three-phase motor, the steps including:
   dividing a main power source into a plurality of auxiliary power sources, wherein at least one of said auxiliary power sources is a lower magnitude than said main power source, said main power source appropriate for said three-phase motor;
   determining status of an enclosure; and
   activating switching means, said switching means connecting said phase motor to one said power source, wherein magnitude of said power source is chosen according to said status, and wherein said three-phase motor operates a fan in said enclosure.

9. An apparatus for reducing heat generated by a three-phase motor operating under load, comprising, in combination:
   a power supply;
   said three-phase motor coupled to a fan and to said power supply, said motor connected to said power supply by means of three power conductors;
   a plurality of capacitors, said capacitors inserted into said power conductors such that equal capacitance is introduced into each said power conductor; and
   further comprising means to select power input level connected to said motor, wherein said means to select power input level alternatively connects said motor to said power supply and said plurality of capacitors.

10. The apparatus of claim 9 wherein said plurality of capacitors are sequestered in groups parallel to said power conductors and engaged selectively into operation by a switching means.

* * * * *